United States Patent
Ktenas et al.

(10) Patent No.: US 7,738,578 B2
(45) Date of Patent: Jun. 15, 2010

(54) METHOD AND DEVICE FOR SELECTING SPREADING PARAMETERS FOR AN OFDM-CDMA SYSTEM

(75) Inventors: Dimitri Ktenas, Fontaine (FR); Mathieu Bouvier Des Noes, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 781 days.

(21) Appl. No.: 11/566,900

(22) Filed: Dec. 5, 2006

(65) Prior Publication Data

US 2007/0177655 A1   Aug. 2, 2007

(30) Foreign Application Priority Data

Dec. 5, 2005   (FR)   ................... 05 12311

(51) Int. Cl.
*H04K 1/10*   (2006.01)
(52) U.S. Cl. ................. 375/260; 375/130
(58) Field of Classification Search ........... 375/130, 375/260, 295; 370/320, 208–209, 335, 342, 370/441
See application file for complete search history.

(56) References Cited

U.S. PATENT DOCUMENTS

| | | | |
|---|---|---|---|
| 2004/0252632 A1* | 12/2004 | Bourdoux et al. | ........... 370/210 |
| 2006/0074612 A1* | 4/2006 | Kent et al. | ...................... 703/2 |
| 2006/0268962 A1* | 11/2006 | Cairns et al. | ................ 375/148 |
| 2007/0253496 A1* | 11/2007 | Giannakis et al. | ........... 375/260 |

FOREIGN PATENT DOCUMENTS

EP   1 503 535 A1   10/2003

OTHER PUBLICATIONS

French Search Report FA 675054; FR 0512311, Aug. 17, 2006.
French Search Report FA 680290; FR 0601945, Nov. 22, 2006.
W. Zhendao and G. B. Giannakis, "*Wireless Multicarrier Communications—Where Fourier meets Shannon*"; IEEE Signal Processing Magazine, vol. 17, Issue: 3, May 2000.
Maryline Hélard, Rodolphe Le Gouable, J.F Hélard, J.Y. Baudais, "*Multicarrier CDMA Techniques For Future Wideband Wireless Networks*", Ann. Telecom 56, No. 5-6, pp. 260-274, 2001.

(Continued)

*Primary Examiner*—Emmanuel Bayard
(74) *Attorney, Agent, or Firm*—Brinks Hofer Gilson & Lione

(57) ABSTRACT

To select the frequency ($S_F$) and/or time ($S_T$) spreading parameters for a communication system using a quadrature amplitude modulation and implementing a CDMA technique and an OFDM multiplexing the attenuation coefficients of the propagation channel are estimated For all the F sub-bands of $S_F$ subcarriers and the T blocks of $S_T$ OFDM symbols, at least one asymptotic signal-to-interference+noise ratio (SINR) is determined, based on the attenuation coefficients of the propagation channel and the type of equalizer used by the receiver. From this, for each coded information block obtained from the modulation, the compressed asymptotic SINR is deduced, expressed by an analytical formula dependent on the frequency ($S_F$) and time ($S_T$) spreading parameters and the frequency ($S_F$) and time ($S_T$) spreading parameters which maximize the value of the compressed asymptotic SINR are selected.

26 Claims, 5 Drawing Sheets

OTHER PUBLICATIONS

N. Maeda, Y. Kishiyama, K. Higuchi, H. Atarashi and M. Sawahashi, "*Experimental Evaluation of Throughput Performance in Broadband Packet Wireless Access Based on VSF-OFCDM and VSD-CDMA*", IEEE PIMRC 2003, pp. 6-11.

Ericsson, "*System-Level Evaluation Of OFDM—Further Considerations*", TSG-RAN WG1 #35, Lisbon, Portugal, Nov. 17-21, 2003, R1-031303 3GPP2-C30-20030429-010.

P. Robertson, P. Hoeher, E. Villebrun, "*Optimal and Sub-Optimal Maximum A Posteriori Algorithms Suitable For Turbo-Decoding*", European Transactions on Telecommunications, pp. 119-125, 1997.

N. Maeda, Y. Kishiyama, H. Atarashi and M. Sawahashi, "*Variable Spreading Factor OFCDM With Two Dimensional Spreading That Prioritizes Time Domain Spreading For Forward Link Broadband Wireless Access*", VTC Spring 2003, pp. 127-132, Jeju Island, Korea, Apr. 2003.

F. Tosato, P. Bisaglia, "*Simplified Soft-Output Demapper for Binary Interleaved COFDM with Application to HIPERLAN/2*", IEEE International Conference on Communications ICC 2002, pp. 664-668, vol. 2.

M. Debbah, W. Hachem, P. Loubaton, and M. de Courville, "*MMSE Analysis Of Certain Large Isometric Random Precoded Systems*", IEEE Trans. on Information theory, vol. 43, May, No. 5 -2003.

P. Jallon, M. des Noes, D. Ktenas and J. M. Brossier, "*Asymptotic Analysis Of The Multiuser MMSE Receiver For The Downlink Of A MG-CDMA System*", Proc. of VTC Spring 2003, Jeju, Korea.

M. des Noës and D. Kténas, "*Performance Comparison Between MG-CDMA and DS-CDMA for Broadband Wireless Transmissions*", proc. of VTC Spring 2004, Milan, Italy.

Cours de Mathématiques du MIT (MIT's OpenCourseWare), "*The Lagrange Multiplier Technique*", peut être téléchargé a l'URL suivante: http:,//ocw.mit.edu/NR/rdonlvres (Mathematics/1 8-466 Mathematical-StatisticsSpring2003/F6138C74-AA64-4B63-9A60-38A4833AECCB/0/acof.pdf.

W.H. Press, B.P. Flannery, S.A. Teukolsky, W.T. Vetterling, "*Numerical Recipes in C, Chapter 10.1*", pp. 397-402, Cambridge University Press 1988.

\* cited by examiner

METHOD AND DEVICE FOR SELECTING SPREADING PARAMETERS FOR AN OFDM-CDMA SYSTEM

PRIORITY CLAIM

Priority is claimed to French patent application no. 0512311 filed Dec. 5, 2005, the disclosure of which is incorporated by reference herein.

TECHNICAL FIELD

The present invention relates to a method and a device for selecting spreading parameters of an OFDM-CDMA (orthogonal frequency division multiplexing-code division multiple access) system.

BACKGROUND

The generic term OFDM-CDMA will be used hereinafter to denote a system using time/frequency spreading.

FIG. 1 illustrates the general architecture of a conventional OFDM-CDMA digital transmitter for a downlink from a base station to a mobile terminal.

The bits $a_0(n), \ldots, a_{K-1}(n)$ from the K users are first sent to a respective channel coding module $10_0, \ldots, 10_{K-1}$. The channel coding module comprises an encoder, which can, for example, be a convolutional-type encoder, a turbocoder or an LDPC (low-density parity-check code) type coder. The channel coding module also comprises a punching device and a bit interleaver. It supplies as output data $b_0(n), \ldots, b_{K-1}(n)$.

The binary data $b_0(n), \ldots, b_{K-1}(n)$ is then sent to a respective I/Q modulation unit $12_0, \ldots, 12_{K-1}$, which modulates the encoded bits, for example by a four-state quadrature amplitude modulation QAM-4 and supplies as output data $d_0(n), \ldots, d_{K-1}(n)$.

The data $d_0(n), \ldots, d_{K-1}(n)$ from the various users is then processed by a spreading module 14.

Then, the spread signals are processed by a chip allocation module 16, which places them on a time/frequency grid.

The resulting signal is then transmitted to an OFDM modulator, which comprises in turn a serial-parallel conversion unit 18, which supplies as output data $x_0(n), \ldots, x_{N-1}(n)$, N being the number of subcarriers, an inverse fast Fourier transform unit 20, a parallel-serial conversion unit 22 and a cyclic prefix insertion unit 24. The symbols obtained are sent over a transmission channel.

For a description of the conventional OFDM techniques, it is worth referring to the article by W. ZHENDAO and G. B. GIANNAKIS entitled "Wireless Multicarrier Communications—Where Fourier meets Shannon", IEPE Signal Processing Magazine, vol. 17, no. 3, pages 29 to 48, May 2000.

FIG. 2 details the spreading module 14 of the transmitter. Each symbol $d_K(n)$ of the user k (k=0, \ldots, K-1) is first assigned an amplitude $\sqrt{P_K}$ by a module $26_K$. Then, in a module $28_K$, the rate is stepped up by a factor L and finally a digital filtering $c_K(z)$ is applied in a module $30_K$, the filtering coefficients being equal to the chips of the spreading sequence of the user k.

Each symbol $d_K(n)$ of the user k is spread by a sequence of L chips $c_k(Z)$. The spread signals of all the users are then added together by an adder module 32.

As described above, the chip allocation module 16 allocates the samples originating from the spreading module 14 over a time/frequency grid. It is assumed that the spreading factor L is equal to $S_F \times S_T$, where $S_F$ is the spreading parameter in the frequency domain and $S_T$ is the spreading parameter in the time domain.

FIGS. 3 to 5 represent time-frequency grids respectively in the cases where $S_T=1$ (FIG. 3), $S_F=1$ (FIG. 4) and $S_F$ and $S_T$ are anything (FIG. 5).

FIG. 3 illustrates the case where $S_T=1$. In this case, the characteristics of a conventional MC-CDMA system apply. $F=N/S_F$ data symbols are transmitted by code in an OFDM symbol.

FIG. 4 illustrates the case where $S_F=1$. In this case, the characteristics of a conventional MC-DS-CDMA system apply. F=N data symbols are transmitted by code on $S_T$ OFDM symbols.

FIG. 5 illustrates the case where $S_F$ and $S_T$ are anything. In this case, $F=N/S_F$ data symbols are transmitted by code on $S_T$ OFDM symbols.

The chip allocation module 16 represented in FIG. 1 supplies as output a size vector N which can be expressed according to the equation (1), the size of this vector corresponding to the size of the fast Fourier transform:

$$x_i[qS_F + p] = \sum_{k=0}^{K-1} \sqrt{P_k}\, d_k[q] c_k[pS_T + i] \tag{1}$$

where:
- $i=0, \ldots, S_T-1$ corresponds to the index of the OFDM symbol,
- $q=0, \ldots, F-1$ corresponds to the index of the sub-band,
- $p=0, \ldots, S_F-1$ corresponds to the index of the subcarrier,
- $S_F$ is the spreading factor in the frequency domain,
- $S_T$ is the spreading factor in the time domain,
- K is the total number of users,
- $P_k$ is the power associated with the $k^{th}$ user,
- $d_k$ are the symbols associated with the $k^{th}$ user, and
- $c_k$ is the spreading code for the $k^{th}$ user.

After transposition into the time domain via the inverse fast Fourier transform unit 20, a cyclic prefix is added by the cyclic prefix insertion unit 24. It contains $N_G \geq W-1$ samples, where W is the maximum duration of the impulse response of the overall channel.

FIG. 6 represents the structure of a conventional OFDM-CDMA digital receiver corresponding to the transmitter illustrated in FIG. 1.

A rough synchronization module 60 handles, on the one hand, the detection of the start of the OFDM symbol and, on the other hand, the initial estimation of the offset $\Delta F$ between the carrier frequencies of the transmitter and the receiver and the offset $\Delta T$ between the sampling clocks of the transmitter and of the receiver.

This estimation is called rough in the sense that the estimation variance is high. This makes it possible to enter into the operating range of the receiver, but requires a so-called fine correction, to achieve the desired performance levels. Thus, the synchronization is carried out in two phases.

After a rough synchronization, the cyclic prefix is eliminated by a cyclic prefix suppression module 62 and the signal is conditioned into vectors of N samples $r_i(m)$, $m=0, \ldots, N-1$, the index i indicating the number of the received OFDM symbol. The processing operations carried out to decode the symbols of the user k=0 are described below. The results obtained are presumed identical for the other users.

The samples $r_i(m)$ are then supplied to a serial-parallel conversion unit 64 and then to a fast Fourier transform unit 66 and a channel estimation unit 68, itself linked to a unit for estimating the propagation conditions of the channel 70.

The channel estimation unit 68 is also linked to a linear equalizer 72 which applies a coefficient $g_i[qS_F+p]$ for each subcarrier. The equalizer 72 is linked to a correlation module 74, which supplies as output the estimated symbols $\hat{d}_0(n), \ldots, \hat{d}_{K-1}(n)$.

It will be assumed that the coefficients of the linear equalizer are calculated independently of the spreading codes. The equalizers can be MRC (maximum ratio combining), EGC (equal gain combining), ZF (zero forcing) or MMSE (minimum mean square error) linear equalizers, well known to those skilled in the art.

The estimated symbols obtained as output from the correlation module 74 can be expressed according to the equation (2):

$$\hat{d}_0[q] = \sum_{p=0}^{S_F-1}\sum_{i=0}^{S_T-1} g_i[qS_F+p]c_0^*[pS_T+i]x_i[qS_F+p]h_i[qS_F+p] + \sum_{p=0}^{S_F-1}\sum_{i=0}^{S_T-1} g_i[qS_F+p]c_0^*[pS_T+i]w_i[qS_F+p] \quad (2)$$

where:
- $g_i[qS_F+p]$ is the coefficient applied by the equalizer to the $p^{th}$ subcarrier of the $q^{th}$ sub-band of the $i^{th}$ OFDM symbol,
- $c_0$ is the spreading code of the user 0,
- the sign * denotes the conjugate complex,
- $i[qS_F+p]$ corresponds to the symbols supplied as output by the fast Fourier transform unit 66 on the $p^{th}$ subcarrier of the $q^{th}$ sub-band of the $i^{th}$ OFDM symbol,
- $i[qS_F+p]$ corresponds to the attenuation of the channel for the $p^{th}$ subcarrier of the $q^{th}$ sub-band of the $i^{th}$ OFDM symbol, and
- $i[qS_F+p]$ corresponds to the Gaussian additive white noise sample of variance $\sigma^2$ on the $p^{th}$ subcarrier of the $q^{th}$ sub-band of the $i^{th}$ OFDM symbol.

The data is then sent to a flexible I/Q demodulation unit 76. The so-called "hard" I/Q demodulation operation consists in restoring the binary values transmitted based on the complex symbols derived from the linear detector. When a flexible-input channel decoder is used, the optimal values to be injected into the channel decoder are flexible values. The term "flexible values" is used to mean values that are not directly the hard values "0" or "1". Thus, if a QAM-16 (4-bit) modulation is used, the flexible I/Q demodulation consists in calculating four flexible values corresponding to the four bits of the QAM-16 modulation. The optimal flexible (or metric) values to be injected into the flexible-input channel decoder correspond to the likelihood ratio logarithm (LRL).

The flexible I/Q demodulation operation is followed by the channel decoding process, performed by modules 78₀, ..., 78$_{K-1}$. These modules perform bit disinterleaving, unpunching and decoding operations (for example, via a Viterbi decoder in the case of a convolutional coder in transmission, by the Max log-MAP algorithm in the case of a turbocoder or by the Min-Sum algorithm in the case of LDPC coding). This restores the transmitted binary data.

In the state of the art, the unit for estimating the propagation conditions of the channel 70 is used to evaluate the instantaneous signal-to-interference+noise ratio (SINR) and/or the maximum spread of the delays and/or the maximum Doppler frequency. These three parameters measure the propagation conditions of the channel. Depending on the values of these parameters forwarded to the transmitter by return loop, the transmitter can decide to adapt the spreading parameters $S_F$ and $S_T$ in order to improve the transmission quality.

Nevertheless, the methods of calculating the maximum spread of the delays and of the Doppler frequency are not easy to implement. Moreover, the instantaneous SINR is not an optimal criterion in the selection of the spreading parameters when a channel coding/decoding process is used.

The concept of asymptotic SINR is now introduced. When the dimensions of the system become large in terms of the number and size of the spreading codes, the random matrices theory offers very powerful analysis tools with which to obtain explicit SINR values at the output of the equalizer, while taking into account the property of orthogonality of the spreading codes. This asymptotic regime is, nevertheless, obtained for routine values of the spreading factors (for example, size 32).

The expression of the asymptotic SINR for the user of rank 0 of an OFDM-CDMA system for the sub-band of rank q is given by the following formula:

$$SINR_o[q] = \frac{S_0[q]}{I[q]+N[q]} \quad (3)$$

where $S_0[\cdot]$ corresponds to the power of the wanted signal after equalization and correlation, $I[\cdot]$ corresponds to the power of the multiple access noise created by the other spreading codes and $N[\cdot]$ corresponds to the power of the Gaussian noise filtered by the equalizer and the spreading sequence, with:

$$S_0[q] = p_0\left|\frac{1}{L}\sum_{p=0}^{S_F-1}\sum_{i=0}^{S_T-1} g_i[qS_F+p]h_i[qS_F+p]\right|^2 \quad (4)$$

where:
- $p_0$ is the power applied to the user of rank 0,
- $L=S_F\times S_T$,
- $g_i[qS_F+p]$ is the equalization coefficient for the $p^{th}$ subcarrier of the $q^{th}$ sub-band for the $i^{th}$ OFDM symbol, this equalization coefficient depending on the transmission channel, and
- $h_i[qS_F+p]$ corresponds to the attenuation of the channel for the $p^{th}$ subcarrier of the $q^{th}$ sub-band for the $i^{th}$ OFDM symbol.

$$I[q] = \alpha\overline{p}\left(\frac{1}{L}\sum_{p=0}^{S_F-1}\sum_{i=0}^{S_T-1}|g_i[qS_F+p]|^2|h_i[qS_F+p]|^2 - \left|\frac{1}{L}\sum_{p=0}^{S_F-1}\sum_{i=0}^{S_T-1}g_i[qS_F+p]h_i[qS_F+p]\right|^2\right) \quad (5)$$

where:
- $\alpha=K/L$ is the system load (K being the total number of users), and $$\overline{p} = \frac{1}{K-1} \sum_{k=1}^{K-1} p_k$$

is the average power of the interfering codes, and $$N[q] = \sigma^2 \frac{1}{L} \sum_{p=0}^{S_F-1} \sum_{i=0}^{S_T-1} |g_i[qS_F + p]|^2 \quad (6)$$

where $\sigma^2$ is the variance of the noise.

If the system under consideration is a multiple-cell system, the variance of the noise $\sigma^2$ contains the power of the thermal noise $N_0$ and the power received by the user of rank 0 originating from the other interfering base stations.

These different values are obtained independently of the value of the spreading codes, while taking into account the orthogonality property of the codes.

It is shown that the asymptotic SINR can be used to estimate precisely and easily the bit error rate (BER) before channel coding.

However, a real system employs a channel coder and its effect on system performance levels should be taken into account.

The article by N. MAEDA, Y. KISHIYAMA, H. ATARASHI and M. SAWAHASHI entitled "Variable Spreading Factor OFCDM with two dimensional spreading that prioritizes time domain spreading for forward link broadband wireless access", VTC Spring 2003, pages 127 to 132, Jeju Island, Korea, April 2003, reveals the impact of the modulation and coding scheme on the performance levels (BER) of an OFDM-CDMA system, according to the parameters of the propagation channel (bandwidth and coherence time of the channel) and the spreading parameters $S_F$ and $S_T$.

Furthermore, in the article by N. MAEDA, Y. KISHIYAMA, K. HIGUCHI, H. ATARASHI and M. SAWAHASHI entitled "Experimental Evaluation of Throughput Performance in Broadband Packet Wireless Access Based on VSF-OFCDM and VSD-CDMA", IEEE PIMRC 2003, pages 6 to 11, the use of the instantaneous SINR measured by the above formula (3) to select the spreading parameters $S_F$ and $S_T$ is not very advantageous, because this SINR does not depend on the spreading parameters, since it is obtained by measuring the power of the wanted signal and the power of the interferences and of the thermal noise.

It cannot therefore be used to directly select the optimal spreading parameters $S_F$ and $S_T$ when the system uses a channel coding/decoding module. In practice, there are several SINR values representing one and the same coded data block incoming to the channel decoder. These multiple SINR values are due to the fact that the propagation channel varies in time and frequency within a coded information block. It is consequently ineffective to optimize the SINR given by the formula (3) because the channel coding and modulation must be taken into account.

SUMMARY

In one aspect, the invention selects two-dimensional spreading parameters for the downlink of a multi-carrier system with a CDMA-type multiple access. These are time and frequency spreading parameters, respectively denoted $S_T$ and $S_F$.

The invention is particularly applicable in the field of telecommunications, for communication systems using the CDMA multiple access technique combined with an OFDM transmission, such as, for example, the MC-CDMA (multi-carrier-code division multiple access), MC-DS-CDMA (multi-carrier-direct sequence-code division multiple access) systems or two-dimensional (2D) spread time/frequency systems.

To this end, the present invention proposes a method of selecting frequency ($S_F$) and/or time ($S_T$) spreading parameters for a communication system including a transmitter and a receiver and using a quadrature amplitude modulation and implementing a code division multiple access (CDMA) technique and orthogonal frequency division multiplexing (OFDM), in which the frequency domain is divided into $F=N/S_F$ sub-bands of $S_F$ subcarriers, N being the size of the fast Fourier transform used by the receiver and $S_F$ being the frequency spreading parameter, and the time domain is divided into $T=N_S/S_T$ blocks of $S_T$ OFDM symbols, $N_S$ being the number of OFDM symbols used to code a data frame and $S_T$ being the time spreading parameter, this method being noteworthy in that it includes steps according to which:

1) the attenuation coefficients of the propagation channel are estimated;

2) for all the F sub-bands of $S_F$ subcarriers and the T blocks of $S_T$ OFDM symbols, at least one asymptotic signal-to-interference+noise ratio (SINR) is determined, based on the attenuation coefficients of the propagation channel and the type of equalizer used by the receiver;

3) from this, for each coded information block obtained from the modulation, the compressed asymptotic signal-to-interference+noise ratio is deduced, expressed by an analytical formula dependent on the frequency ($S_F$) and time ($S_T$) spreading parameters; and 4) the frequency and time spreading parameters which maximize the value of the compressed asymptotic signal-to-interference+noise ratio are selected.

Thus, the frequency $S_F$ and time $S_T$ spreading parameters are optimized through the calculation of the compressed asymptotic SINR. This optimization makes it possible to improve the transmission quality between the transmitter and the receiver according to the characteristics of the propagation channel, namely, the coherence band $B_{coh}$ of the channel and the coherence time $T_{coh}$ of the channel.

The compressed SINR can moreover be used to estimate the bit error rate or the packet error rate at the receiver, which indicates the quality of the communication.

Advantageously, several asymptotic SINRs are determined and, in particular, all the asymptotic SINRs $\gamma(i,j)$ that occur in the formula given below for the compressed asymptotic SINR, denoted $SINR_{compressed}$ are determined. This makes it possible to obtain a more accurate selection of the spreading parameters and so improve the transmission.

In particular, when the values of the asymptotic SINR $\gamma(i,j)$ vary greatly within the coded information block obtained from the modulation, it is advantageous to use all these values (which are therefore F×T in number) to calculate the compressed asymptotic SINR.

On the other hand, when the values of the asymptotic SINR $\gamma(i,j)$ vary little within the coded information block, it is advantageous to use only a small number of these values.

In a particular embodiment, in the step for calculating the compressed asymptotic SINR, the compressed asymptotic SINR is calculated using the following formula:

$$SINR_{compressed} = -\lambda \ln\left(\frac{L}{NN_S}\sum_{i=0}^{F-1}\sum_{j=0}^{T-1} e^{-\frac{\gamma(i,j)}{\lambda}}\right)$$

where:
- $\lambda$ is a scalar known in advance by the receiver, dependent on the modulation and the coding, the method of obtaining of which will be described below,
- L is the spreading factor: $L=S_F \times S_T$,
- i and j are positive integers, and
- $\gamma(i,j)$ is the asymptotic SINR of the $i^{th}$ sub-band of the $j^{th}$ block of $S_T$ OFDM symbols.

In a particular embodiment, in the step for calculating the compressed asymptotic SINR, the compressed asymptotic SINR is calculated iteratively using the following approximation:

$$\ln(e^a + e^b) \approx \max(a,b) + f_c(|a-b|)$$

where $f_c(|a-b|)$ is a pre-calculated table dependent only on $(|a-b|)$ and approximating the function $\ln(1+e^{-|a-b|})$.

This makes it possible to simplify the calculation of the compressed asymptotic SINR by avoiding exponentiation and logarithm calculation operations.

In a particular embodiment, the selection step consists in carrying out an exhaustive search for the pair of frequency and time spreading parameters that maximizes the value of the compressed asymptotic SINR.

This embodiment is particularly simple to implement when the number of values of the pair of spreading parameters is small, for example, around 10.

As a variant, the selection step consists in applying a Golden section search method.

This variant is particularly advantageous when the user is moving slowly, for example at a speed of around 3 km/h, or in the case where the channel varies little in frequency.

According to another variant, the selection step consists in applying a constrained optimization method using the Lagrange multiplication technique, where the constraint is expressed $g(S_F,S_T)=S_F S_T - L$, $S_F$ being the frequency spreading parameter, $S_T$ being the time spreading parameter and L being the spreading factor.

This variant gives excellent results in terms of quality.

It should be noted that all the above embodiments are applicable regardless of the type of equalizer used.

Nevertheless, the invention further proposes various particular embodiments in particular equalizer cases.

In a particular embodiment, when the inventive method is implemented in conjunction with a receiver comprising a single-user MMSE (minimum mean square error) equalizer, the asymptotic SINR $\gamma(i,j)$ of the $i^{th}$ sub-band of the $j^{th}$ block of $S_T$ OFDM symbols, for $i=0,\ldots,F-1$ and $j=0,\ldots,T-1$, is defined by the following formula:

$$\gamma(i,j) = \frac{p_0 \cdot \eta^2(i,j)}{\alpha\overline{p}\left[\frac{1}{L}\sum_{p=0}^{S_F-1}\sum_{k=0}^{S_T-1}\frac{|h_{j\cdot S_T+k}[i\cdot S_F+p]|^4}{(|h_{j\cdot S_T+k}[i\cdot S_F+p]|^2+\mu)^2} - \eta^2(i,j)\right] + \frac{\sigma^2}{L}\sum_{p=0}^{S_F-1}\sum_{k=0}^{S_T-1}\frac{|h_{j\cdot S_T+k}[i\cdot S_F+p]|^2}{(|h_{j\cdot S_T+k}[i\cdot S_F+p]|^2+\mu)^2}}$$

where
$$\begin{cases}\eta(i,j) = \frac{1}{L}\sum_{p=0}^{S_F-1}\sum_{k=0}^{S_T-1}\frac{|h_{j\cdot S_T+k}[i\cdot S_F+p]|^2}{|h_{j\cdot S_T+k}[i\cdot S_F+p]|^2+\mu} \\ \mu = \frac{\sigma^2}{\alpha\frac{1}{K}\sum_{i=0}^{K-1}p_i} \\ \overline{p} = \frac{1}{K-1}\sum_{i=1}^{K-1}p_i\end{cases}$$

where:
- $p_0$ is the power of the signal spread by the spreading code for which the SINR is to be determined,
- L is the spreading factor: $L=S_F \times S_T$,
- $\alpha=K/L$ is the system load, K being the number of spreading codes transmitted,
- $\overline{p}$ is the average power of the interfering spreading codes and the $p_i$ are the powers of the interfering spreading codes, with $i\neq 0$,
- p and k are positive integers,
- $h_{j\cdot S_T+k}[i\cdot S_F+p]$ is the attenuation of the propagation channel for the $(i\cdot S_F+p)^{th}$ subcarrier of the $(j\cdot S_T+k)^{th}$ OFDM symbol, and
- $\sigma^2$ is the variance of the noise.

For a single-user MMSE equalizer, and in the particular case where $$\frac{1}{K-1}\sum_{i=1}^{K-1}p_i = \frac{1}{K}\sum_{i=0}^{K-1}p_i,$$

the asymptotic SINR is defined by the following relation:

$$\gamma(i,j) = \frac{p_0 \cdot \eta(i,j)}{\alpha\overline{p}(1-\eta(i,j))}$$

where
$$\begin{cases}\eta(i,j) = \frac{1}{L}\sum_{p=0}^{S_F-1}\sum_{k=0}^{S_T-1}\frac{|h_{j\cdot S_T+k}[i\cdot S_F+p]|^2}{|h_{j\cdot S_T+k}[i\cdot S_F+p]|^2+\mu} \\ \mu = \frac{\sigma^2}{\alpha\overline{p}} \\ \overline{p} = \frac{1}{K-1}\sum_{i=1}^{K-1}p_i\end{cases}$$

with the same notations as previously.

These embodiments with MMSE equalizer can be used to obtain a trade-off between reduced multiple access interference and raised noise level.

In another particular embodiment, when the method according to the invention is implemented in conjunction with a receiver comprising an MRC (maximum ratio combining) equalizer, the asymptotic SINR $\gamma(i,j)$ of the $i^{th}$ sub-band of the $j^{th}$ block of $S_T$ OFDM symbols, for $i=0,\ldots,F-1$ and $j=0,\ldots,T-1$, is defined by the following formula:

$$\gamma(i,j) = \frac{p_0 \cdot \eta^2(i,j)}{\alpha \bar{p}\left(\frac{1}{L}\sum_{p=0}^{S_F-1}\sum_{k=0}^{S_T-1}|h_{j\cdot S_T+k}[i\cdot S_F+p]|^4 - \eta^2(i,j)\right) + \sigma^2 \eta(i,j)}$$

with $$\eta(i,j) = \frac{1}{L}\sum_{p=0}^{S_F-1}\sum_{k=0}^{S_T-1}|h_{j\cdot S_T+k}[i\cdot S_F+p]|^2,$$

where:
- $p_0$ is the power of the signal spread by the spreading code for which the SINR is to be determined,
- L is the spreading factor: $L = S_F \times S_T$,
- $\alpha = K/L$ is the system load, K being the number of spreading codes transmitted,
- $\bar{p}$ is the average power of the interfering spreading codes,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise.

This embodiment with MRC equalizer is particularly advantageous in a single-user context to optimize the signal-to-noise ratio at the equalizer output.

In another particular embodiment, when the method according to the invention is implemented in conjunction with a receiver comprising a multi-user MMSE (minimum mean square error) equalizer, the asymptotic SINR $\gamma(i,j)$ of the $i^{th}$ sub-band of the $j^{th}$ block of $S_T$ OFDM symbols, for $i = 0, \ldots, F-1$ and $j = 0, \ldots, T-1$ is the solution of the following implicit equation:

$$1 = \frac{1}{L}\sum_{p=0}^{S_F-1}\sum_{k=0}^{S_T-1}\frac{1}{\frac{\sigma^2}{|h_{j\cdot S_T+k}[i\cdot S_F+p]|^2}\, A(\alpha, p_k, \gamma(i,j)) + \alpha \cdot B(\alpha, p_k, \gamma(i,j))}$$

where:
- L is the spreading factor: $L = S_F \times S_T$,
- $\alpha = K/L$, K being the number of spreading codes transmitted,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise,
- $p_k$ is the power applied to the $k^{th}$ user, and:

$$A(\alpha, p_k, \gamma(i,j)) = (1-\alpha)\frac{\gamma(i,j)}{p_k} + \alpha \cdot \gamma(i,j) \cdot m(p_k, \gamma(i,j))$$

$$B(\alpha, p_k, \gamma(i,j)) = 1 - p_k \cdot m(p_k, \gamma(i,j))$$

$$m(p_k, \gamma(i,j)) = \int_{-\infty}^{+\infty}\frac{\mu_{power}(u)}{p_k + \gamma(i,j)\cdot u}du$$

where $\mu_{power}(p)$ is the limit distribution of the power when L and K tend towards infinity and $\alpha = K/L$ remains constant.

This embodiment is particularly advantageous in a multi-user context.

In another particular embodiment, when the method according to the invention is implemented in conjunction with a receiver comprising an EGC (equal gain combining) equalizer, the asymptotic SINR $\gamma(i,j)$ of the $i^{th}$ sub-band of the $j^{th}$ block of $S_T$ OFDM symbols, for $i = 0, \ldots, F-1$ and $j = 0, \ldots, T-1$, is defined by the following formula:

$$\gamma(i,j) = \frac{p_0 \cdot \eta^2(i,j)}{\alpha \bar{p}\left(\frac{1}{L}\sum_{p=0}^{S_F-1}\sum_{k=0}^{S_T-1}|h_{j\cdot S_T+k}[i\cdot S_F+p]|^2 - \eta^2(i,j)\right) + \sigma^2}$$

with $$\eta(i,j) = \frac{1}{L}\sum_{p=0}^{S_F-1}\sum_{k=0}^{S_T-1}|h_{j\cdot S_T+k}[i\cdot S_F+p]|,$$

where:
- $p_0$ is the power of the signal spread by the spreading code for which the SINR is to be determined,
- L is the spreading factor: $L = S_F \times S_T$,
- $\alpha = K/L$ is the system load, K being the number of spreading codes transmitted,
- $\bar{p}$ is the average power of the interfering spreading codes,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise.

Given that the EGC equalizer corrects only the phase of the signal and allows the amplitude of each subcarrier to be retained after equalization, this embodiment makes it possible to retain the orthogonality of the codes in a channel with unlimited noise (unlike an MRC equalizer) and so reduce the interference term.

For the same purpose as indicated above, the present invention also proposes a device for selecting frequency and/or time spreading parameters for a communication system including a transmitter and a receiver and using a quadrature amplitude modulation and implementing a code division multiple access (CDMA) technique and an orthogonal frequency division multiplexing (OFDM), in which the frequency domain is divided into $F = N/S_F$ sub-bands of $S_F$ sub-carriers, N being the size of the fast Fourier transform used by the receiver and $S_F$ being the frequency spreading parameter, and the time domain is divided into $T = N_S/S_T$ blocks of $S_T$ OFDM symbols, $N_S$ being the number of OFDM symbols used to code a data frame and $S_T$ being the time spreading parameter, this device being noteworthy in that it includes:

1) a module for estimating the attenuation coefficients of the propagation channel;

2) a module for determining, for all the F sub-bands of $S_F$ subcarriers and the T blocks of $S_T$ OFDM symbols, at least one asymptotic signal-to-interference+noise ratio (SINR), from the coefficients of the attenuation of the propagation channel and the type of equalizer used by the receiver;

3) a calculation module for deducing from this, for each coded information block obtained from the modulation, the compressed asymptotic signal-to-interference+noise ratio, which is expressed by an analytical formula dependent on the frequency and time spreading parameters; and 4) a module for selecting the frequency and time spreading parameters which maximize the value of the compressed asymptotic signal-to-interference+noise ratio.

Still for the same purpose, the present invention further proposes a radio-mobile system simulation unit suitable for implementing a method of selecting spreading parameters as above.

Still for the same purpose, the present invention further proposes a radio-mobile system simulation unit comprising a device for selecting spreading parameters as above.

Still for the same purpose, the present invention also proposes:

1) a wireless mobile telephony device suitable for implementing a method of selecting spreading parameters as above, and 2) a wireless mobile telephony device comprising a device for selecting spreading parameters as above.

In practice, the invention can also be applied to a reception device such as a mobile telephone, in the context of a method of sending and receiving signals where signals are transmitted by a transmitting device to wireless telephony devices and where at least one of these wireless telephony devices calculates the compressed asymptotic SINR that concerns it in the way described above.

This mobile telephony device can thus select the spreading parameters suitable for optimizing the compressed asymptotic SINR. The optimal spreading parameters are then returned to the transmitting device in order to optimize the transmission for this mobile. This optimization of the spreading parameters can be done directly on the transmitting device if the mobile returns to the transmitter the channel attenuation information and the type of equalizer used.

The particular characteristics and advantages of the selection device, of the units for simulating a radio-mobile system and of the mobile telephony devices are similar to those of the selection method, so they will not be repeated here.

BRIEF DESCRIPTION OF THE DRAWING

Other aspects and advantages of the invention will become apparent from reading the following detailed description of particular embodiments, given by way of non-limiting examples. The description refers to the accompanying drawings, in which.

DETAILED DESCRIPTION

In the deliberations of the 3GPP, a technique called "Effective Exponential SIR Mapping" (EESM) has been proposed to find a compressed SINR that makes it possible to estimate the BER at the output of the channel decoder. Reference can usefully be made on this subject to the Ericsson documents entitled "Effective SNR mapping for modeling frame error rates in multiple-state channels", 3GPP2-C30-20030429-010 and "System-level evaluation of OFDM—further considerations", TSG-RAN WG1 #35, Lisbon, Portugal, 17-21 Nov. 2003, R1-031303.

Figure 7:
FIG. 7 is a schematic block diagram of a known EESM technique.

The schematic block diagram of EESM is illustrated in FIG. 7. It is assumed that a coded frame transports N QAM symbols (for example QAM-2, also called BPSK, or QAM-4, also called QPSK, or QAM-16), each having an SINR (non-asymptotic), denoted $SINR_n$, n=1, ..., N.

The EESM technique consists in finding a unique SINR, called compressed SINR, which makes it possible to estimate the bit error rate at the output of the channel decoder. For this, a conversion table is constructed which gives the BER at the output of the channel decoder according to the incoming SINR for a Gaussian propagation channel. This table is constructed either by simulation, or analytically when the theory permits it.

The compressed SINR is given by the following formula:

$$SINR_{compressed} = -\beta \ln\left(\frac{1}{N_{states}} \sum_{i=1}^{N_{states}} \exp\left(-\frac{SINR_i}{\beta}\right)\right) \quad (7)$$

where $\beta$ is a parameter that depends on the modulation and coding scheme and $N_{states}$ represents the number of states of the channel on the coded information block. It should be noted that the parameter $\beta$ can be obtained by IT simulation in the same way as the parameter $\lambda$ that occurs in the equation (13) given below. Reference will therefore be made to the detailed description of the method of obtaining $\lambda$.

The present invention applies this technique of compressing the SINR to the asymptotic SINR obtained in the case of an OFDM-CDMA system by the formula (3) given in the introduction, so as to obtain an asymptotic SINR value for each coded information block, which will be called compressed asymptotic SINR.

It is assumed that the frequency domain is divided into $F=N/S_F$ sub-bands of $S_F$ subcarriers, N being the size of the fast Fourier transform used by the receiver and $S_F$ being the frequency spreading parameter, and the time domain is divided into $T=N_S/S_T$ blocks of $S_T$ OFDM symbols, $N_S$ being the number of OFDM symbols used to code a data frame and $S_T$ being the time spreading parameter.

Figure 8:
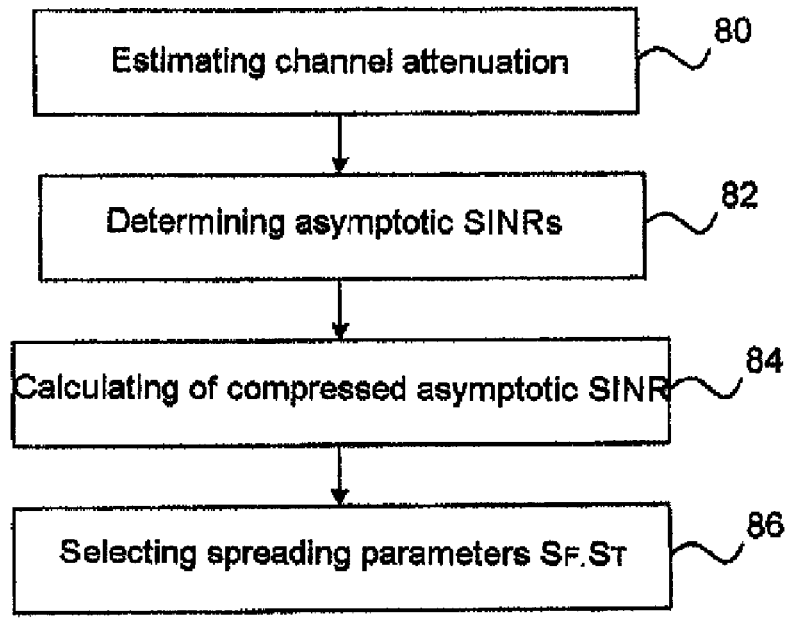
FIG. 8 is a flow diagram illustrating the main steps of a method of selecting spreading parameters according to the present invention, in a particular embodiment.

As the flow diagram in FIG. 8 shows, in a particular embodiment, a first step 80 of the method of selecting spreading parameters consists in estimating the coefficients $h_p[n]$ representing the attenuation of the propagation channel for the $n^{th}$ subcarrier of the $p^{th}$ OFDM symbol, for p=1, ..., $N_S$ and n=1, ..., N.

Then these estimates of the channel can be used, in a step 82, to determine for all the F sub-bands of $S_F$ subcarriers and the T blocks of $S_T$ OFDM symbols, at least one asymptotic SINR according to the formula (3).

It is assumed that the following parameters are known prior to determining the asymptotic SINR:

$\bar{p}$: average power of the interfering spreading codes, $p_0$: power of the signal spread by the spreading code for which the SINR is to be calculated, $\sigma^2$: variance of the additional Gaussian noise (also containing the power of the interfering cells in the case of a multiple-cell environment), $h_p[n]$ attenuation of the channel for the $n^{th}$ subcarrier of the $p^{th}$ OFDM symbol;

L: spreading factor, that is, the length of the spreading codes,

K: number of spreading codes transmitted,

N: size of the fast Fourier transform, $N_S$: size of a "slot", namely the number of OFDM symbols used to code a data frame.

Some of the above parameters are known from the signaling and others can be obtained using a channel estimation mechanism.

Figure 9:
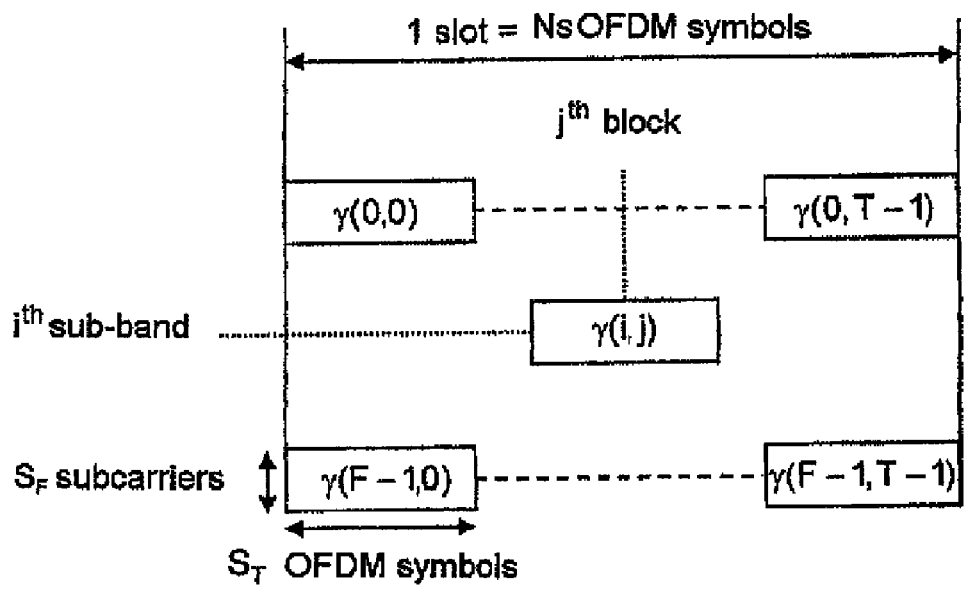
FIG. 9 illustrates the division into blocks and sub-bands of a "slot", that is, of the number of OFDM symbols used to code a data frame.

Since a slot contains $N_S$ OFDM symbols of N subcarriers, there are $NN_S/L$ different asymptotic SINRs, denoted $\gamma(i,j)$, to be calculated according to the equation (3). As FIG. 9 shows, the frequency domain can be divided into $F=N/S_F$ sub-bands of $S_F$ subcarriers, whereas the time domain is divided into $T=N_S/S_T$ blocks of $S_T$ OFDM symbols. The asymptotic SINR $\gamma(i,j)$ is the SINR of the $i^{th}$ sub-band of the $j^{th}$ block, $i=0, \ldots, F-1, j=0, \ldots, T-1$.

In the case where the method of selecting spreading parameters in accordance with the present invention is implemented in a transmitting-receiving system where the receiver comprises a single-user MMSE equalizer, the asymptotic SINR $\gamma(i,j)$ is defined by the following formula:

$$\gamma(i,j) = \frac{p_0 \cdot \eta^2(i,j)}{\alpha \bar{p} \left( \frac{1}{L} \sum_{p=0}^{S_F-1} \sum_{k=0}^{S_T-1} \frac{|h_{j \cdot S_T+k}[i \cdot S_F+p]|^4}{(|h_{j \cdot S_T+k}[i \cdot S_F+p]|^2+\mu)^2} - \eta^2(i,j) \right)^2} + \frac{\sigma^2}{L} \sum_{p=0}^{S_F-1} \sum_{k=0}^{S_T-1} \frac{|h_{j \cdot S_T+k}[i \cdot S_F+p]|^2}{(|h_{j \cdot S_T+k}[i \cdot S_F+p]|^2+\mu)^2}$$

where $$\begin{cases} \eta(i,j) = \frac{1}{L} \sum_{p=0}^{S_F-1} \sum_{k=0}^{S_T-1} \frac{|h_{j \cdot S_T+k}[i \cdot S_F+p]|^2}{|h_{j \cdot S_T+k}[i \cdot S_F+p]|^2+\mu} \\ \mu = \frac{\sigma^2}{\alpha \frac{1}{K} \sum_{i=0}^{K-1} p_i} \\ \bar{p} = \frac{1}{K-1} \sum_{i=1}^{K-1} p_i \end{cases}$$

where:

$p_0$ is the power of the signal spread by the spreading code for which the SINR is to be determined, L is the spreading factor: $L=S_F \times S_T$, $\alpha=K/L$ is the system load, K being the number of spreading codes transmitted, $\bar{p}$ is the average power of the interfering spreading codes and the $p_i$ are the powers of the interfering spreading codes, with $i \neq 0$, p and k are positive integers, $h_j \cdot s_{T+k}[i \cdot S_F+p]$ is the attenuation of the propagation channel for the $(i \cdot S_F+P)^{th}$ subcarrier of the $(j \cdot S_T+k)^{th}$ OFDM symbol, and $\sigma^2$ is the variance of the noise.

Still for a single-user MMSE equalizer, in the particular case where $$\frac{1}{K-1} \sum_{i=1}^{K-1} p_i = \frac{1}{K} \sum_{i=0}^{K-1} p_i,$$

where the $p_i$, for $i \neq 0$, are the powers of the interfering spreading codes, the asymptotic SINR is defined by the following relation:

$$\gamma(i,j) = \frac{p_0 \cdot \eta(i,j)}{\alpha \bar{p}(1 - \eta(i,j))} \quad (8)$$

where $$\begin{cases} \eta(i,j) = \frac{1}{L} \sum_{p=0}^{S_F-1} \sum_{k=0}^{S_T-1} \frac{|h_{j \cdot S_T+k}[i \cdot S_F+p]|^2}{|h_{j \cdot S_T+k}[i \cdot S_F+p]|^2+\mu} \\ \mu = \frac{\sigma^2}{\alpha \bar{p}} \\ \bar{p} = \frac{1}{K-1} \sum_{i=1}^{K-1} p_i \end{cases}$$

with the same notations as previously.

For an MRC equalizer, the asymptotic SINR $\gamma(i,j)$ is defined by the following formula;

$$\gamma(i,j) = \frac{p_0 \cdot \eta^2(i,j)}{\alpha \bar{p} \left( \frac{1}{L} \sum_{p=0}^{S_F-1} \sum_{k=0}^{S_T-1} |h_{j \cdot S_T+k}[i \cdot S_F+p]|^4 - \eta^2(i,j) \right) + \sigma^2 \eta(i,j)} \quad (9)$$

where $$\eta(i,j) \approx \frac{1}{L} \sum_{p=0}^{S_F-1} \sum_{k=0}^{S_T-1} |h_{j \cdot S_T+k}[i \cdot S_F+p]|^2$$

with the same notations as previously.

For a multi-user MMSE equalizer, the asymptotic SINR $\gamma(i,j)$ is the solution to the following implicit equation:

$$1 = \frac{1}{L} \sum_{p=0}^{S_F-1} \sum_{k=0}^{S_T-1} \frac{1}{\frac{\sigma^2}{|h_{j \cdot S_T+k}[i \cdot S_F+p]|^2} A(\alpha, p_k, \gamma(i,j)) + \alpha \cdot B(\alpha, p_k(i,j))} \quad (10)$$

with the same notations as previously, and:

$$A(\alpha, p_k, \gamma(i, j)) = (1 - \alpha)\frac{\gamma(i, j)}{p_k} + \alpha \cdot \gamma(i, j) \cdot m(p_k, \gamma(i, j)) \quad (11)$$

$$B(\alpha, p_k, \gamma(i, j)) = 1 - p_k \cdot m(p_k, \gamma(i, j))$$

$$m(p_k, \gamma(i, j)) = \int_{-\infty}^{\infty} \frac{\mu_{power}(u)}{p_k + \gamma(i, j) \cdot u} du$$

where $\mu_{power}(p)$ is the limit distribution of the power when the size L of the spreading codes and the number K of spreading codes transmitted tend towards infinity and $\alpha=K/L$ remains constant. For example, if the system has $K_c$ power classes $p_1, \ldots, p_{Kc}$, then $\mu_{power}$ $$u = \sum_{i=0}^{K_c-1} \gamma_i \delta(p - p_i),$$

where $\gamma_i$ is the ratio of codes belonging to the class i of power $p_i$, and $\delta(\cdot)$ is the Dirac distribution.

For an EGC equalizer, the asymptotic SINR is defined by the following relation:

$$\gamma(i, j) = \frac{p_0 \cdot \eta^2(i, j)}{\alpha \overline{p}\left(\frac{1}{L}\sum_{p=0}^{S_F-1}\sum_{k=0}^{S_T-1} |h_{j \cdot S_T + k}[i \cdot S_F + p]|^2 - \eta^2(i, j)\right) + \sigma^2} \quad (12)$$

with $$\eta(i, j) = \frac{1}{L}\sum_{p=0}^{S_F-1}\sum_{k=0}^{S_T-1} |h_{j \cdot S_T + k}[i \cdot S_F + p]|$$

and the same notations as previously.

After the step 82 for determining the asymptotic SINRs $\gamma(i,j)$, the step 84 consists in deducing from them the compressed asymptotic SINR, by means of the following formula:

$$SINR_{compressed} = -\lambda \ln\left(\frac{L}{NN_S}\sum_{i=0}^{F-1}\sum_{j=0}^{T-1} e^{-\frac{\gamma(i,j)}{\lambda}}\right) \quad (13)$$

where the scalar $\lambda$ depends only on the modulation and the coding scheme (efficiency of the coder and bit interleaver). In practice, $\lambda$ is independent of the propagation channel, the system load and the combination ($S_F$, $S_T$).

The different values of $\lambda$ are known in advance by the receiver.

The scalar $\lambda$ can be obtained by IT simulation. The simulations required are performed according to the following procedure. First, for a coded information frame i, a set of channel implementations corresponding to the channel model concerned is drawn. This can be used, for the coded information frame i, to obtain a compressed asymptotic SINR that will be denoted $SINR^i_{compressed}(\lambda)$, dependent on $\lambda$.

Then, using a table (also obtained by simulation) giving the bit error rate (BER) at the output of the channel decoder as a function of the SINR at its input for a Gaussian channel, a theoretical bit error rate is obtained that depends on $\lambda$, that will be denoted $BER^i_{theoretical}(\lambda)$. This theoretical BER dependent on $\lambda$ is then compared to the real BER, denoted $BER^i_{real}$, measured by simulations at the output of the channel decoder.

In order to obtain a number of values of $BER^i_{theoretical}(\lambda)$ for one and the same value of $\lambda$, these operations are repeated over a large number of frames (for example 1000 frames). Each $BER^i_{theoretical}(\lambda)$ is then compared to the $BER^i_{real}$.

The scalar $\lambda$ is then obtained by minimizing, over all the coded information frames, the difference between $BER^i_{real}$ and $BER^i_{theoretical}(\lambda)$.

With the scalar $\lambda$ depending on the modulation and coding scheme, the process is repeated for all the modulation and coding schemes under consideration.

Figure 1:
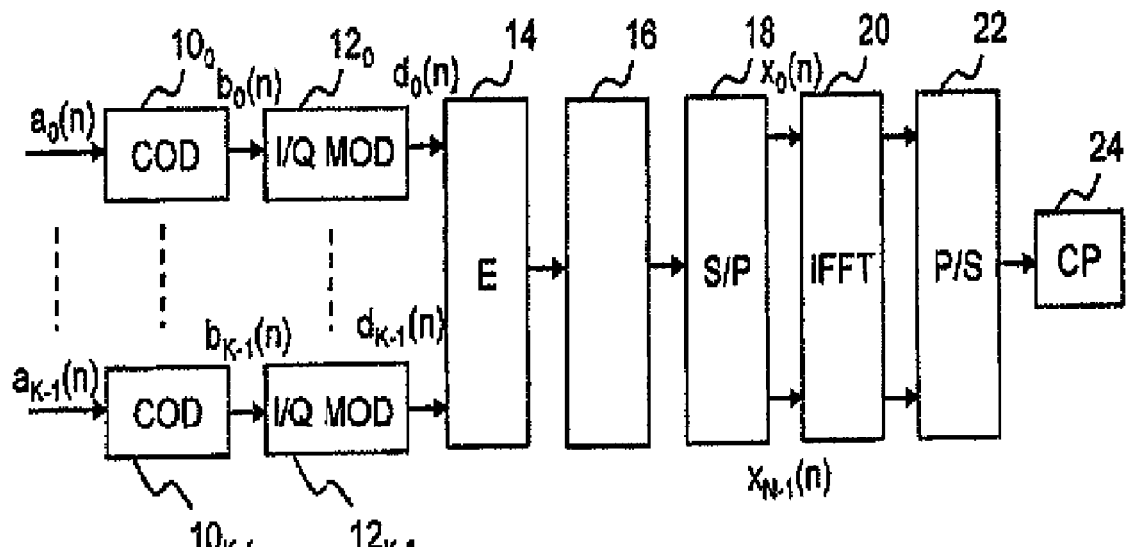
FIG. 1, diagrammatically represents a conventional OFDM-CDMA transmitter.
Figure 2:
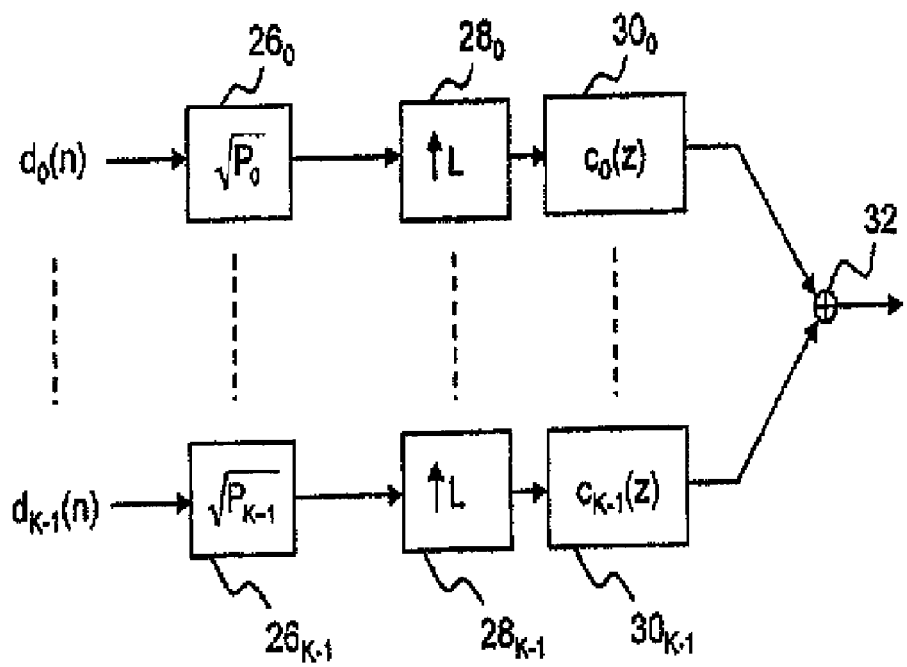
FIG. 2 diagrammatically represents the architecture of the spreading module of FIG. 1.
Figure 3:
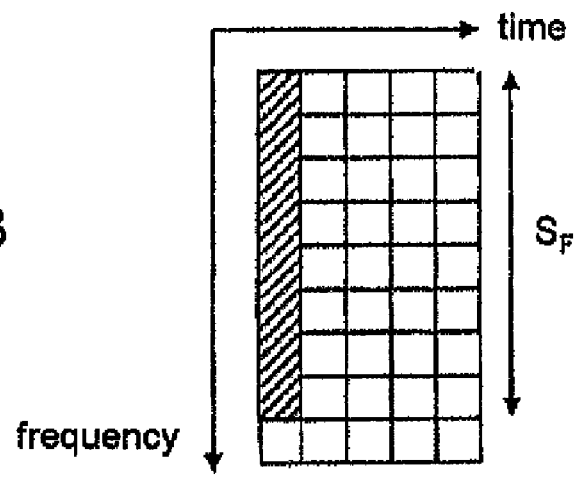
FIGS. 3-5 represent the time-frequency grids for various values of the spreading factors in the frequency and time domains.
Figure 4:
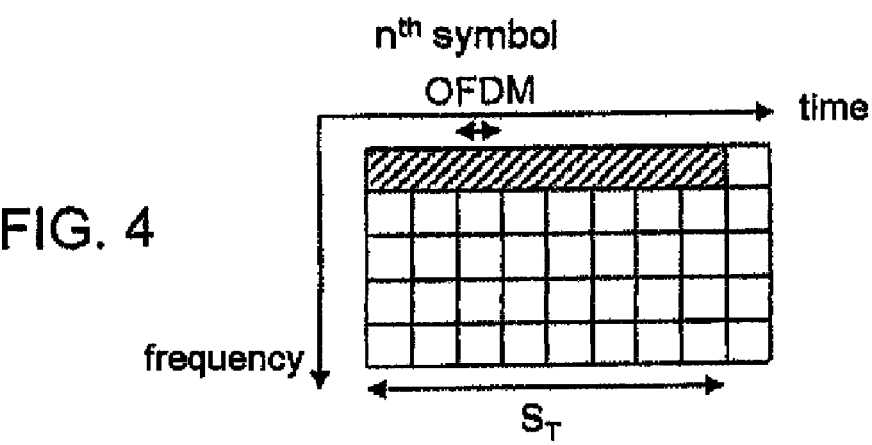
Figure 5:
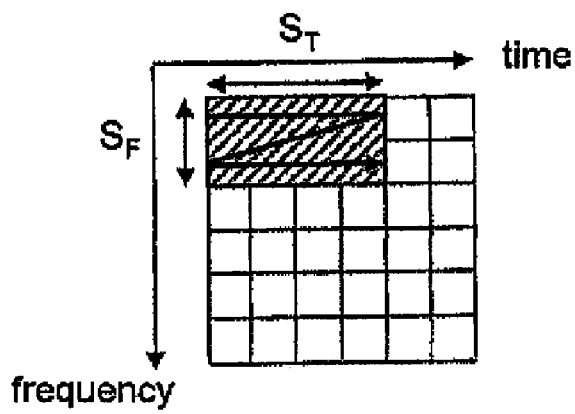
Figure 6:
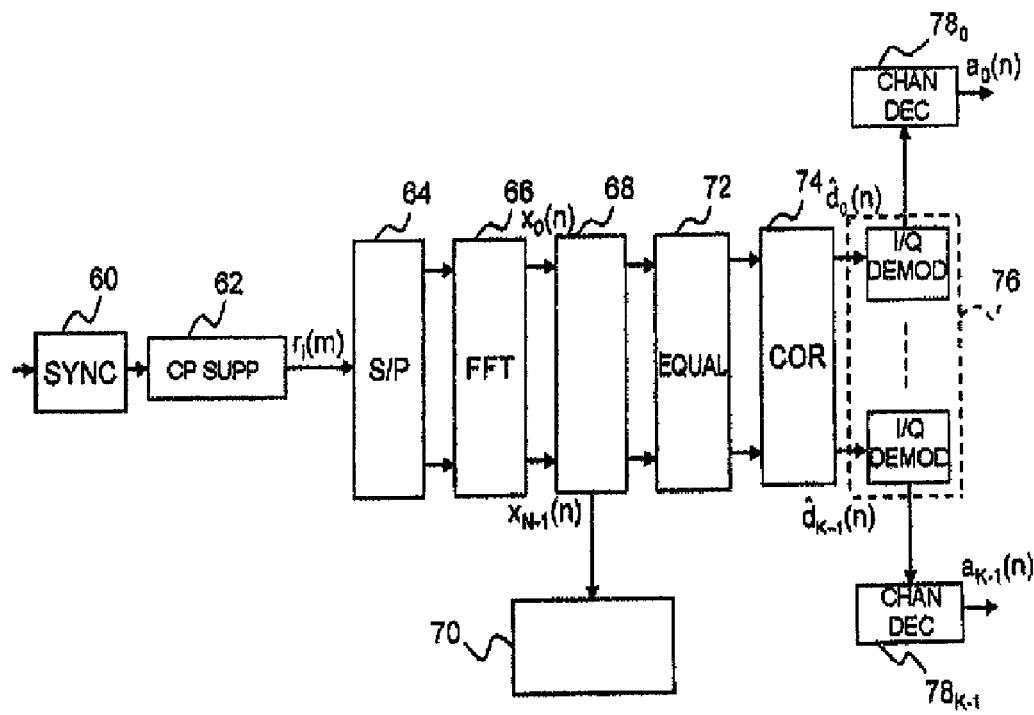
FIG. 6 diagrammatically represents a conventional OFDM-CDMA receiver.

The unit for estimating the propagation conditions of the channel 70 (see FIG. 6) can therefore calculate the compressed asymptotic SINR for different pairs ($S_F$,$S_T$) and determine the optimal combination.

Thus, in the step 86, the values of the frequency $S_F$ and time $S_T$ spreading parameters that maximize the compressed asymptotic SINR calculated previously are selected.

This process of optimizing the compressed SINR can be performed in various ways.

To select, in the step 86, the best pair ($S_F$,$S_T$), an exhaustive-type search can be conducted, by calculating the compressed asymptotic SINR for different configurations of $S_F$ and $S_T$. For example, if the spreading factor $L=S_F \times S_T$ is 32, the compressed asymptotic SINR can be calculated for ($S_F$, $S_T$)$\in\{(1,32), (4,8), (8,4), (32,1)\}$. The highest value out of the four values of the SINR obtained in this way will thus provide the configuration ($S_F$,$S_T$) to be retained, for a given modulation/coding pair.

As a variant, a Golden section search method can be applied. Reference can usefully be made on this subject to the work by W. H. PRESS, B. P. FLANNERY, S. A. TEUKOLSKY and W. T. VETTERLING published in 1988 by Cambridge University Press, entitled "Numerical Recipes in C" and more particularly to its chapter 10.1, pages 397 to 402. This is a method that can be used to reduce the search interval optimally when considering a system with one unknown, either the parameter $S_F$ or the parameter $S_T$.

This method will advantageously be used in the case of a user who is moving slowly, for example at a speed of around 3 km/h, or in the case where the channel varies little in frequency.

In the first case, where the user is moving slowly, the value of the parameter $S_T$ is set (for example $S_T=16$) and $S_F$ is sought by the Golden method. In the case where the channel varies little in frequency (for example when the coherence band is greater than $S_F$), the value of $S_F$ is set (for example $S_F=16$) and $S_T$ is sought by the Golden method.

According to another variant, to select the best pair ($S_F$,$S_T$), a constrained optimization method can be applied using the Lagrange multiplication technique, with $g(S_F,S_T)=S_F S_T-L$ as the constraint. The Lagrange multiplication technique is well known to those skilled in the art; a description can be found on the Internet at the following address: http://ocw.mit.edu/NR/rdonlyres/Mathematics/18-466Mathematical-StatisticsSpring2003/F6138C74-AA64-4B63-9A60-38A4833AECCB/0/appf.pdf The present invention also proposes a simplification of the calculation of the compressed asymptotic SINR given by the formula (13), avoiding having to calculate the logarithms and exponentials of the quantities involved.

For this, the following approximation is used:

$$\ln(e^a + e^b) \approx \max(a,b) + f_c(|a-b|) \quad (14)$$

where $f_c(|a-b|)$ is a pre-calculated table dependent only on $(|a-b|)$ and very precisely approximating the function $\ln(1+e^{-|a-b|})$. Reference can usefully be made on this subject to the article by P. ROBERTSON, P. HOEHER AND E. VILLEBRUN entitled "Optimal and sub-optimal maximum a posteriori algorithms suitable for turbo-decoding", European Transactions on Telecommunications, pages 119 to 125, 1997.

The approximation of the compressed asymptotic SINR is therefore calculated iteratively: assuming that n−1 values are known, the $n^{th}$ can be deduced therefrom as follows:

$$\ln(e^{a_1} + \ldots + e^{a_n}) = \ln(A + e^{a_n}) \text{ with } A = e^{a_1} + \ldots + e^{a_{n-1}} = e^\alpha$$

$$\ln(e^{a_1} + \ldots + e^{a_n}) = \max(\ln(A), a_n) + f_c(|\ln(A) - a_n|) \max(\alpha, a_n) + f_c(|\alpha - a_n|) \quad (15)$$

Figure 10:
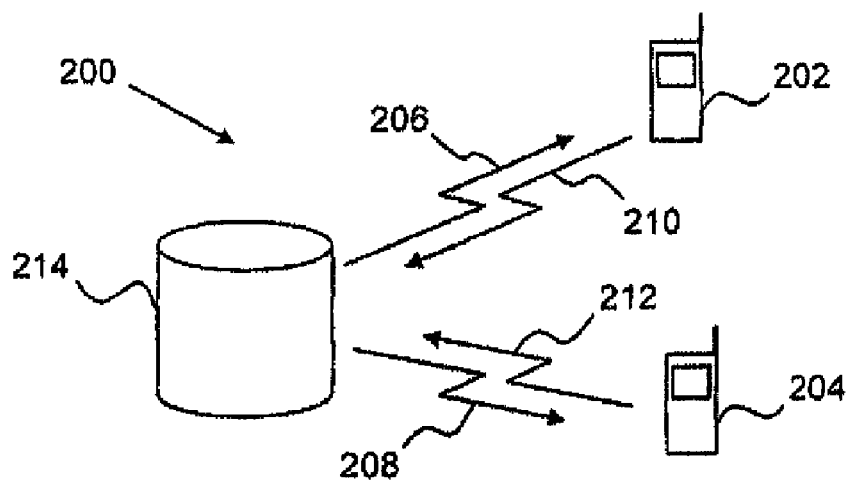
FIG. 10 diagrammatically represents, in a particular embodiment, mobile telephony devices implementing the present invention.

The invention can be applied to a receiver device such as a mobile telephone. FIG. 10 shows the case of a system comprising a mobile telephony broadcasting network 200 consisting of a network server, a transmission infrastructure and an installed base of wireless mobile or portable reception devices 202, 204, for example mobile telephones associated with the network.

Messages 206, 208 are sent to the portable devices 202, 204 whereas the latter retransmit information 210, 212 in return, for example the channel attenuation information or the spreading parameters suitable for optimizing the transmission.

The portable devices can therefore calculate the compressed asymptotic SINR according to the formula (13) in order to select the spreading parameters suitable for maximizing this compressed asymptotic SINR.

These spreading parameters are then returned to a sending base station 214, which will be able to adjust various transmission parameters, such as, for example, the spreading parameters or the modulation-coding scheme. The spreading parameters can be optimized directly on the transmitter if the mobile device returns to the transmitter the channel attenuation information and the type of equalizer used.

The present invention can also be applied to the radio-mobile system simulators.

Such a system simulator is a piece of software that can be used to model a multiple-cell environment in order to obtain the performance characteristics of a network in terms of the bit rate within a cell, the distribution of the average bit rates of the users within a cell or the distribution of the average packet transmission delays.

Figure 11:
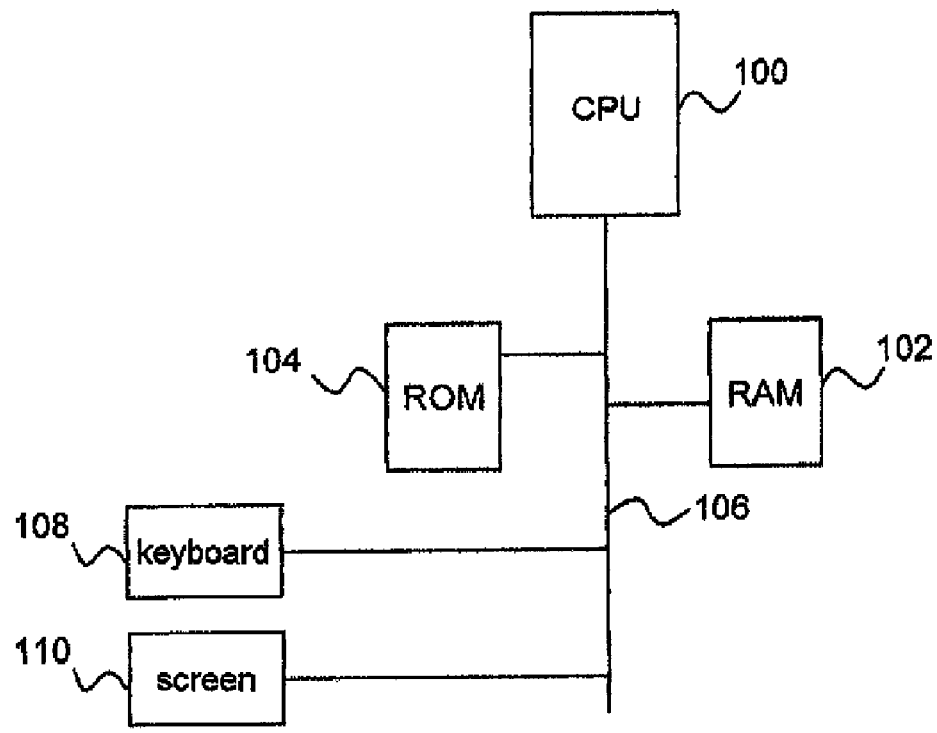
FIG. 11 diagrammatically represents, in a particular embodiment, a unit likely to include a radio-mobile system simulator implementing the present invention.

The system simulator is installed in a unit of the type of that represented in FIG. 11 comprising at least one processor 100, a set of RAM memories 102, for storing the data, and ROM memories 104, for example for storing program instructions. These various elements are linked by a bus 106.

A peripheral element such as a keyboard 108 enables the user of the system simulator to enter data in response to a message displayed on a display screen 110. The user can thus select, for example, the mobility model (position and speed of the mobile) or a model for the propagation channel.

Integrating the calculation of the compressed asymptotic SINR according to the formula (13) in a system simulator makes it possible not only to select optimal spreading parameters for an OFDM-CDMA system, but also to obtain the packet error rate after channel decoding, which is an indicator of communication quality.

The invention claimed is:

1. A method of selecting frequency ($S_F$) or time ($S_T$) spreading parameters or both for a communication system including a transmitter and a receiver and using a quadrature amplitude modulation and implementing a code division multiple access (CDMA) technique and orthogonal frequency division multiplexing (OFDM), in which the frequency domain is divided into $F = N/S_F$ sub-bands of $S_F$ sub-carriers, N being the size of the fast Fourier transform used by the receiver and $S_F$ being the frequency spreading parameter, and the time domain is divided into $T = N_S/S_T$ blocks of $S_T$ OFDM symbols, where $N_S$ is the number of OFDM symbols used to code a data frame and $S_T$ is the time spreading parameter, the method comprising:
estimating attenuation coefficients of the propagation channel;
determining at least one asymptotic signal-to-interference+noise ratio (SINR) for all the F sub-bands of $S_F$ subcarriers and the T blocks of $S_T$ OFDM symbols, based on the attenuation coefficients of the propagation channel and the type of equalizer used by the receiver;
deducing a compressed asymptotic SINR for each coded information block obtained from the modulation expressed by an analytical formula dependent on the frequency $S_F$ and time $S_T$ spreading parameters; and
selecting the frequency $S_F$ and time $S_T$ spreading parameters which maximize the value of the compressed asymptotic SINR.

2. The method according to claim 1 deducing at least one asymptotic SINR comprises calculating the compressed asymptotic SINR using the following formula:

$$SINR_{compressed} = -\lambda \ln\left(\frac{L}{NN_S} \sum_{i=0}^{F-1} \sum_{j=0}^{T-1} e^{-\frac{\gamma(i,j)}{\lambda}}\right)$$

where:
λ is a scalar known in advance by the receiver, dependent on the modulation and the coding,
L is the spreading factor: $L = S_F \times S_T$,
i and j are positive integers, and
γ(i,j) is the asymptotic SINR of the $i^{th}$ sub-band of the $j^{th}$ block of $S_T$ OFDM symbols.

3. The method according to claim 2, wherein the compressed asymptotic SINR, the compressed asymptotic SINR is calculated iteratively using the following approximation:

$$\text{Ln}(e^a + e^b) \approx \max(a,b) + f_c(|a-b|)$$

where $f_c(|a-b|)$ is a pre-calculated table dependent only on $(|a-b|)$ and approximating the function $\ln(1 + e^{-|a-b|})$.

4. The method according to claim 1, wherein selecting the frequency ($S_F$) and time ($S_T$) spreading parameters comprises carrying out a search for the pair of frequency and time spreading parameters ($S_F$, $S_T$) that maximizes the value of the compressed asymptotic SINR.

5. The method according to claim 1, selecting the frequency ($S_F$) and time ($S_T$) spreading parameters comprises applying a Golden section search method.

6. The method according to claim 1, selecting the frequency ($S_F$) and time ($S_T$) spreading parameters comprises applying a constrained optimization method using the Lagrange multiplication technique, where the constraint is expressed $g(S_F,S_T)=S_F S_T-L$, $S_F$ being the frequency spreading parameter, $S_T$ being the time spreading parameter and L being the spreading factor.

7. The method according to claim 1, wherein the method further comprises implementing the method in conjunction with a receiver comprising a single-user MMSE (minimum mean square error) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i,j) = \frac{p_0 \cdot \eta^2(i,j)}{\alpha \bar{p}\left(\frac{1}{L}\sum_{p=0}^{S_F-1}\sum_{k=0}^{S_T-1}\frac{|h_{j\cdot S_T+k}[i\cdot S_F+p]|^4}{(|h_{j\cdot S_T+k}[i\cdot S_F+p]|^2+\mu)^2} - \eta^2(i,j)\right) + \frac{\sigma^2}{L}\sum_{p=0}^{S_F-1}\sum_{k=0}^{S_T-1}\frac{|h_{j\cdot S_T+k}[i\cdot S_F+p]|^2}{(|h_{j\cdot S_T+k}[i\cdot S_F+p]|^2+\mu)^2}}$$

$$\text{where}\begin{cases}\eta(i,j) = \frac{1}{L}\sum_{p=0}^{S_F-1}\sum_{k=0}^{S_T-1}\frac{|h_{j\cdot S_T+k}[i\cdot S_F+p]|^2}{|h_{j\cdot S_T+k}[i\cdot S_F+p]|^2+\mu} \\ \mu = \frac{\sigma^2}{\alpha \frac{1}{K}\sum_{i=0}^{K-1}p_i} \\ \bar{p} = \frac{1}{K-1}\sum_{i=1}^{K-1}p_i\end{cases}$$

where:
- $p_0$ is the power of the signal spread by the spreading code for which the SINR is to be determined,
- L is the spreading factor: $L=S_F \times S_T$,
- $\alpha=K/L$ is the system load, K being the number of spreading codes transmitted,
- $\bar{p}$ is the average power of the interfering spreading codes and the $p_i$ are the powers of the interfering spreading codes, with $i \neq 0$,
- p and k are positive integers,
- $h_{j\cdot S_T+k}[i\cdot S_F+p]$ is the attenuation of the propagation channel for the $(i\cdot S_F+p)^{th}$ subcarrier of the $(j\cdot S_T+k)^{th}$ OFDM symbol, and $\sigma^2$ is the variance of the noise.

8. The method according to claim 7, wherein $$\frac{1}{K-1}\sum_{i=1}^{K-1}p_i \frac{1}{K}\sum_{i=0}^{K-1}p_i \text{ applies,}$$

applies, where K is the number of spreading codes transmitted and the $i \neq 0$, are the powers of the interfering spreading codes, characterized in that the asymptotic SINR is defined by the following relation:

$$\gamma(i,j) = \frac{p_0 \cdot \eta(i,j)}{\alpha \bar{p}(1-\eta(i,j))}$$

$$\text{where}\begin{cases}\eta(i,j) = \frac{1}{L}\sum_{p=0}^{S_F-1}\sum_{k=0}^{S_T-1}\frac{|h_{j\cdot S_T+k}[i\cdot S_F+p]|^2}{|h_{j\cdot S_T+k}[i\cdot S_F+p]|^2+\mu} \\ \mu = \frac{\sigma^2}{\alpha \bar{p}} \\ \bar{p} = \frac{1}{K-1}\sum_{i=1}^{K-1}p_i\end{cases}$$

where:
- $p_0$ is the power of the signal spread by the spreading code for which the SINR is to be determined,
- L is the spreading factor: $L=S_F \times S_T$,
- $\alpha=K/L$ is the system load,
- $\bar{p}$ is the average power of the interfering spreading codes,
- p and k are positive integers
- $h_{j\cdot S_T+k}[i\cdot S_F+p]$ is the attenuation of the propagation channel for the $(i\cdot S_F+p)^{th}$ subcarrier of the $(j\cdot S_T+k)^{th}$ OFDM symbol, and
- $\sigma^2$ is the variance of the noise.

9. The method according to claim 1, further comprising implementing the method in conjunction with a receiver comprising an MRC (maximum ratio combining) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i,j) = \frac{p_0 \cdot \eta^2(i,j)}{\alpha \bar{p}\left(\frac{1}{L}\sum_{p=0}^{S_F-1}\sum_{k=0}^{S_T-1}|h_{j\cdot S_T+k}[i\cdot S_F+p]|^4 - \eta^2(i,j)\right) + \sigma^2 \eta(i,j)}$$

$$\text{with } \eta(i,j) = \frac{1}{L}\sum_{p=0}^{S_F-1}\sum_{k=0}^{S_T-1}|h_{j\cdot S_T+k}[i\cdot S_F+p]|^2$$

where:
- $p_0$ is the power of the signal spread by the spreading code for which the SINR is to be determined,
- L is the spreading factor: $L=S_F \times S_T$,
- $\alpha=K/L$ is the system load, K being the number of spreading codes transmitted,
- $\bar{p}$ is the average power of the interfering spreading codes,
- p and k are positive integers,
- $h_{j\cdot S_T+k}[i\cdot S_F+p]$ is the attenuation of the propagation channel for the $(i\cdot S_F+p)^{th}$ subcarrier of the $(j\cdot S_T+k)^{th}$ OFDM symbol, and
- $\sigma^2$ is the variance of the noise.

10. The method according to claim 1, further comprising implementing the method in conjunction with a receiver comprising a multi-user MMSE (minimum mean square error) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$ is the solution of the following implicit equation:

$$1 = \frac{1}{L}\sum_{p=0}^{S_F-1}\sum_{k=0}^{S_T-1}\frac{1}{\frac{\sigma^2}{|h_{j\cdot S_T+k}[i\cdot S_F+p]|^2}A(\alpha,p_k,\gamma(i,j)) + \alpha \cdot B(\alpha,p_k,\gamma(i,j))}$$

where:
- L is the spreading factor: $L=S_F \times S_T$,
- $\alpha=K/L$, K being the number of spreading codes transmitted,
- p and k are positive integers,
- $h_j \cdot s_{T+k}[i \cdot S_F+p]$ is the attenuation of the propagation channel for the $(i \cdot S_F+p)^{th}$ subcarrier of the $(j \cdot S_T+k)^{th}$ OFDM symbol, and
- $\sigma^2$ is the variance of the noise,
- $p_k$ is the power applied to the $k^{th}$ user, and:

$$A(\alpha, p_k, \gamma(i,j)) = (1-\alpha)\frac{\gamma(i,j)}{p_k} + \alpha \cdot \gamma(i,j) \cdot m(p_k, \gamma(i,j))$$

$$B(\alpha, p_k, \gamma(i,j)) = 1 - p_k \cdot m(p_k, \gamma(i,j))$$

$$m(p_k, \gamma(i,j)) = \int_{-\infty}^{+\infty} \frac{\mu_{power}(u)}{p_k + \gamma(i,j) \cdot u} du$$

where $\mu_{power}(p)$ is the limit distribution of the power when L and K tend towards infinity and $\alpha=K/L$ remains constant.

11. The method according to claim 1, further comprising implementing the method in conjunction with a receiver comprising an EGC (equal gain combining) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i,j) = \frac{p_0 \cdot \eta^2(i,j)}{\alpha \bar{p}\left(\frac{1}{L}\sum_{p=0}^{S_F-1}\sum_{k=0}^{S_T-1}|h_{j \cdot S_T+k}[i \cdot S_F + p]|^2 - \eta^2(i,j)\right) + \sigma^2}$$

with $\eta(i,j) = \frac{1}{L}\sum_{p=0}^{S_F-1}\sum_{k=0}^{S_T-1}|h_{j \cdot S_T+k}[i \cdot S_F + p]|$, where:
- $p_0$ is the power of the signal spread by the spreading code for which the SINR is to be determined,
- L is the spreading factor: $L=S_F \times S_T$,
- $\alpha=K/L$ is the system load, K being the number of spreading codes transmitted,
- $\bar{p}$ is the average power of the interfering spreading codes,
- p and k are positive integers,
- $h_{j \cdot S_T+k}[i \cdot S_F+p]$ is the attenuation of the propagation channel for the $(i \cdot S_F+p)^{th}$ subcarrier of the $(j \cdot S_T+k)^{th}$ OFDM symbol, and
- $\sigma^2$ is the variance of the noise.

12. A radio-mobile system simulation unit, wherein the unit is suitable for implementing a method of selecting spreading parameters according to claim 1.

13. A wireless mobile telephony device, wherein the device is suitable for implementing a method of selecting spreading parameters according to claim 1.

14. A device for selecting frequency ($S_F$) or time ($S_T$) spreading parameters or both for a communication system including a transmitter and a receiver and using a quadrature amplitude modulation and implementing a code division multiple access (CDMA) technique and an orthogonal frequency division multiplexing (OFDM), in which the frequency domain is divided into $F=N/S_F$ sub-bands of $S_F$ subcarriers, wherein N is the size of the fast Fourier transform used by the receiver and $S_F$ is the frequency spreading parameter, and the time domain is divided into $T=N_S/S_T$ blocks of $S_T$ OFDM symbols, wherein $N_S$ is the number of OFDM symbols used to code a data frame and $S_T$ is the time spreading parameter, the device further comprising:

- means for estimating the attenuation coefficients of the propagation channel;
- means for determining, for all the F sub-bands of $S_F$ subcarriers and the T blocks of $S_T$ OFDM symbols, at least one asymptotic signal-to-interference+noise ratio (SINR) from the coefficients of the attenuation of the propagation channel and the type of equalizer used by the receiver;
- calculation means for deducing from this, for each coded information block obtained from the modulation, a compressed asymptotic SINR, which is expressed by an analytical formula dependent on said frequency $S_F$ and time $S_T$ spreading parameters; and
- means for selecting the frequency $S_F$ and time $S_T$ spreading parameters which maximize the value of the compressed asymptotic SINR.

15. The device according to claim 14, wherein the means (70) of calculating the compressed asymptotic SINR are suitable for calculating the compressed asymptotic SINR by means of the following formula:

$$SINR_{compressed} = -\lambda \ln\left(\frac{L}{NN_S}\sum_{i=0}^{F-1}\sum_{j=0}^{T-1}e^{-\frac{\gamma(i,j)}{\lambda}}\right)$$

where:
- $\lambda$ is a scalar known in advance by the receiver, dependent on the modulation and the coding,
- L is the spreading factor: $L=S_F \times S_T$,
- i and j are positive integers, and
- $\gamma(i,j)$ is the asymptotic SINR of the $i^{th}$ sub-band of the $j^{th}$ block of $S_T$ OFDM symbols.

16. The device according to claim 15, characterized in that the means (70) of calculating the compressed asymptotic SINR are suitable for calculating the compressed asymptotic SINR iteratively by using the following approximation:

$$\ln(e^a+e^b) \approx \max(a,b)+f_c(|a-b|)$$

where $f_c(|a-b|)$ is a pre-calculated table dependent only on $(|a-b|)$ and approximating the function $\ln(1+r^{-|a-b|})$.

17. The device according to claim 14, wherein the selection means are suitable for carrying out an exhaustive search for the pair of frequency and time spreading parameters ($S_F$, $S_T$) that maximizes the value of the compressed asymptotic SINR.

18. The device according to claim 14, wherein the selection means are suitable for applying a Golden section search method.

19. The device according to claim 14, wherein the selection means are suitable for applying a constrained optimization method using the Lagrange multiplication technique, where the constraint is expressed $g(S_F,S_T)=S_F S_T-L$, $S_F$ being the frequency spreading parameter, $S_T$ being the time spreading parameter and L being the spreading factor.

20. The device according to claim 14 further comprising implementing the device in conjunction with a receiver comprising a single-user MMSE (minimum mean square error) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i, j) = \frac{p_0 \cdot \eta^2(i, j)}{\alpha \overline{p} \left( \frac{1}{L} \sum_{p=0}^{S_F-1} \sum_{k=0}^{S_T-1} \frac{|h_{j \cdot S_T+k}[i \cdot S_F + p]|^4}{(|h_{j \cdot S_T+k}[i \cdot S_F + p]|^2 + \mu)^2} - \eta^2(i, j) \right) +}$$

$$\frac{\sigma^2}{L} \sum_{p=0}^{S_F-1} \sum_{k=0}^{S_T-1} \frac{|h_{j \cdot S_T+k}[i \cdot S_F + p]|^2}{(|h_{j \cdot S_T+k}[i \cdot S_F + p]|^2 + \mu)^2}$$

where
$$\begin{cases} \eta(i, j) = \frac{1}{L} \sum_{p=0}^{S_F-1} \sum_{k=0}^{S_T-1} \frac{|h_{j \cdot S_T+k}[i \cdot S_F + p]|^2}{|h_{j \cdot S_T+k}[i \cdot S_F + p]|^2 + \mu} \\ \mu = \frac{\sigma^2}{\alpha \frac{1}{K} \sum_{i=0}^{K-1} p_i} \\ \overline{p} = \frac{1}{K-1} \sum_{i=1}^{K-1} p_i \end{cases}$$

where:
- $p_0$ is the power of the signal spread by the spreading code for which the SINR is to be determined,
- L is the spreading factor: $L = S_F \times S_T$,
- $\alpha = K/L$ is the system load, K being the number of spreading codes transmitted,
- $\overline{p}$ is the average power of the interfering spreading codes and the $p_i$ are the powers of the interfering spreading codes, with $i \neq 0$,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise.

21. The device according to the claim 20, in which $$\frac{1}{K-1} \sum_{i=1}^{K-1} p_i = \frac{1}{K} \sum_{i=0}^{K-1} p_i \text{ applies,}$$

where K is the number of spreading codes transmitted and the $p_i$ for $i \neq 0$, are the powers of the interfering spreading codes, characterized in that the asymptotic SINR is defined by the following relation:

$$\gamma(i, j) = \frac{p_0 \cdot \eta(i, j)}{\alpha \overline{p}(1 - \eta(i, j))}$$

where
$$\begin{cases} \eta(i, j) = \frac{1}{L} \sum_{p=0}^{S_F-1} \sum_{k=0}^{S_T-1} \frac{|h_{j \cdot S_T+k}[i \cdot S_F + p]|^2}{|h_{j \cdot S_T+k}[i \cdot S_F + p]|^2 + \mu} \\ \mu = \frac{\sigma^2}{\alpha \overline{p}} \\ \overline{p} = \frac{1}{K-1} \sum_{i=1}^{K-1} p_i \end{cases}$$

where:
- $p_0$ is the power of the signal spread by the spreading code for which the SINR is to be determined,
- L is the spreading factor: $L = S_F \times S_T$,
- $\alpha = K/L$ is the system load,
- $\overline{p}$ is the average power of the interfering spreading codes,
- p and k are positive integers

- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise.

22. The device according to claim 14, further comprising implementing the device in conjunction with a receiver comprising an MRC (maximum ratio combining) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i, j) = \frac{p_0 \cdot \eta^2(i, j)}{\alpha \overline{p} \left( \frac{1}{L} \sum_{p=0}^{S_F-1} \sum_{k=0}^{S_T-1} |h_{j \cdot S_T+k}[i \cdot S_F + p]|^4 - \eta^2(i, j) \right) + \sigma^2 \eta(i, j)}$$

with $\eta(i, j) = \frac{1}{L} \sum_{p=0}^{S_F-1} \sum_{k=0}^{S_T-1} |h_{j \cdot S_T+k}[i \cdot S_F + p]|^2$ where:
- $p_0$ is the power of the signal spread by the spreading code for which the SINR is to be determined,
- L is the spreading factor: $L = S_F \times S_T$,
- $\alpha = K/L$ is the system load, K being the number of spreading codes transmitted,
- $\overline{p}$ is the average power of the interfering spreading codes,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise.

23. The device according to claim 14 further comprising implementing the device in conjunction with a receiver comprising a multi-user MMSE (minimum mean square error) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is the solution of the following implicit equation:

$$1 = \frac{1}{L} \sum_{p=0}^{S_F-1} \sum_{k=0}^{S_T-1} \frac{1}{\frac{\sigma^2}{|h_{j \cdot S_T+k}[i \cdot S_F + p]|^2} A(\alpha, p_k, \gamma(i, j)) + \alpha \cdot B(\alpha, p_k, \gamma(i, j))}$$

where:
- L is the spreading factor: $L = S_F \times S_T$,
- $\alpha = K/L$, K being the number of spreading codes transmitted,
- p and k are positive integers,
- $h_j \cdot s_{T+k}[i \cdot S_F + p]$ is the attenuation of the propagation channel for the $(i \cdot S_F + p)^{th}$ subcarrier of the $(j \cdot S_T + k)^{th}$ OFDM symbol, and
- $\sigma^2$ is the variance of the noise,
- $p_k$ is the power applied to the $k^{th}$ user, and:

$$A(\alpha, p_k, \gamma(i, j)) = (1 - \alpha) \frac{\gamma(i, j)}{p_k} + \alpha \cdot \gamma(i, j) \cdot m(p_k, \gamma(i, j))$$

$$B(\alpha, p_k, \gamma(i, j)) = 1 - p_k \cdot m(p_k, \gamma(i, j))$$

$$m(p_k, \gamma(i, j)) = \int_{-\infty}^{+\infty} \frac{\mu_{power}(u)}{p_k + \gamma(i, j) \cdot u} du$$

where $\mu_{power}$ (p) is the limit distribution of the power when L and K tend towards infinity and $\alpha=$K/L remains constant.

24. The device according to claim 14 comprising implementing the device in conjunction with a receiver comprising an EGC (equal gain combining) equalizer, characterized in that the asymptotic SINR $\gamma(i,j)$ of the $i^{th}$ sub-band of the $j^{th}$ block of $S_T$ OFDM symbols, for $i=0, \ldots, F-1$ and $j=0, \ldots, T-1$, is defined by the following formula:

$$\gamma(i, j) = \frac{p_0 \cdot \eta^2(i, j)}{\alpha \overline{p} \left( \frac{1}{L} \sum_{p=0}^{S_F-1} \sum_{k=0}^{S_T-1} |h_{j \cdot S_T+k}[i \cdot S_F + p]|^2 - \eta^2(i, j) \right) + \sigma^2}$$

$$\eta(i, j) = \frac{1}{L} \sum_{p=0}^{S_F-1} \sum_{k=0}^{S_T-1} |h_{j \cdot S_T+k}[i \cdot S_F + p]| \text{ with}$$

where:
- $p_0$ is the power of the signal spread by the spreading code for which the SINR is to be determined,
- L is the spreading factor: $L=S_F \times S_T$,
- $\alpha=$K/L is the system load, K being the number of spreading codes transmitted,
- $\overline{p}$ is the average power of the interfering spreading codes,
- p and k are positive integers,
- $h_j \cdot s_{T+k}[i \cdot S_F+p]$ is the attenuation of the propagation channel for the $(i \cdot S_F+p)^{th}$ subcarrier of the $(j \cdot S_T+k)^{th}$ OFDM symbol, and
- $\sigma^2$ is the variance of the noise.

25. A radio-mobile system simulation unit, wherein the unit comprises a device for selecting spreading parameters according to claim 14.

26. A wireless mobile telephony device, wherein the device comprises a device for selecting spreading parameters according to claim 14.

\* \* \* \* \*